United States Patent
Campbell

(10) Patent No.: US 11,946,550 B2
(45) Date of Patent: Apr. 2, 2024

(54) OVERPRESSURE PROTECTIVE DEVICE AND METHOD FOR PASSIVELY BLOCKING GAS FLOW AT A PRESSURE SETPOINT

(71) Applicant: Weed Instrument Company, Inc., Round Rock, TX (US)

(72) Inventor: Taylor M. Campbell, Austin, TX (US)

(73) Assignee: Weed Instrument Company, Inc., Round Rock, TX (US)

( * ) Notice: Subject to any disclaimer, the term of this patent is extended or adjusted under 35 U.S.C. 154(b) by 0 days.

(21) Appl. No.: 17/991,519

(22) Filed: Nov. 21, 2022

(65) Prior Publication Data

US 2024/0003448 A1 Jan. 4, 2024

Related U.S. Application Data

(60) Provisional application No. 63/357,924, filed on Jul. 1, 2022.

(51) Int. Cl.
*F16K 17/04* (2006.01)

(52) U.S. Cl.
CPC ........ *F16K 17/0493* (2013.01); *F16K 17/044* (2013.01); *Y10T 137/1842* (2015.04)

(58) Field of Classification Search
CPC ........... Y10T 137/1842; F16K 17/0493; F16K 17/044
See application file for complete search history.

(56) References Cited

U.S. PATENT DOCUMENTS

| | | | | |
|---|---|---|---|---|
| 2,155,950 A * | 4/1939 | Nallinger | ................. | F02D 9/00 236/92 R |
| 2,264,677 A * | 12/1941 | Oxland | .............. | G05D 16/0619 236/86 |
| 2,873,754 A * | 2/1959 | Dunaway | .............. | F16K 31/126 92/36 |
| 3,317,666 A * | 5/1967 | Ridder, Jr. | ........... | H04N 5/7425 359/293 |
| 4,143,672 A * | 3/1979 | West | .......................... | B63J 2/10 114/212 |
| 4,699,354 A * | 10/1987 | Gibson | ................. | F16K 31/145 251/367 |
| 4,805,658 A * | 2/1989 | Perkinson | .............. | G05D 16/18 137/115.03 |
| 5,097,860 A * | 3/1992 | Ferguson | ........... | G05D 16/0402 128/204.29 |
| 8,808,071 B2 * | 8/2014 | Bracker | ................ | F16K 31/126 454/72 |
| 2004/0149286 A1 * | 8/2004 | Haston | ................... | A62B 9/022 128/204.26 |

\* cited by examiner

*Primary Examiner* — William M McCalister
(74) *Attorney, Agent, or Firm* — Brian F. Russell

(57) ABSTRACT

An overpressure protective device for passively blocking flow of gas at a selected pressure setpoint includes a valve, a valve stem, and vacuum-filled bellows coupled to the valve stem. The vacuum-filled bellows are configured such that expansion and/or contraction of the bellows as a result of pressure changes present at the valve are harnessed to passively move the valve stem to operate the valve and block pressures higher than a preconfigured pressure setpoint. If the process pressure drops below the pressure setpoint, the overpressure protective device operates the valve to again permit flow of pressurized gas through the valve.

22 Claims, 4 Drawing Sheets

Input pressure      Output pressure

Input pressure      Output pressure

Input pressure      Output pressure

OVERPRESSURE PROTECTIVE DEVICE AND METHOD FOR PASSIVELY BLOCKING GAS FLOW AT A PRESSURE SETPOINT

BACKGROUND

The present disclosure relates generally to gas-filled vessels and, more particularly, to those used in high temperature environments in which supplemental cooling, power, and/or control inputs are unavailable. Still more particularly, the present disclosure relates to a passive device for blocking gas flow at a selected pressure setpoint.

BRIEF SUMMARY OF THE INVENTION

An overpressure protective device and method for passively blocking flow of gas at a selected pressure setpoint are disclosed. The overpressure protective device includes a valve, a valve stem, and one or more vacuum-filled bellows coupled to the valve stem. The vacuum-filled bellows is configured such that expansion and/or contraction of the bellows as a result of pressure changes are harnessed to passively operate the valve to block increases in process pressure above a preconfigured pressure setpoint. If the process pressure drops below the pressure setpoint, the overpressure protective device operates the valve to again permit flow of pressurized gas through the valve.

DETAILED DESCRIPTION

Figure 1:
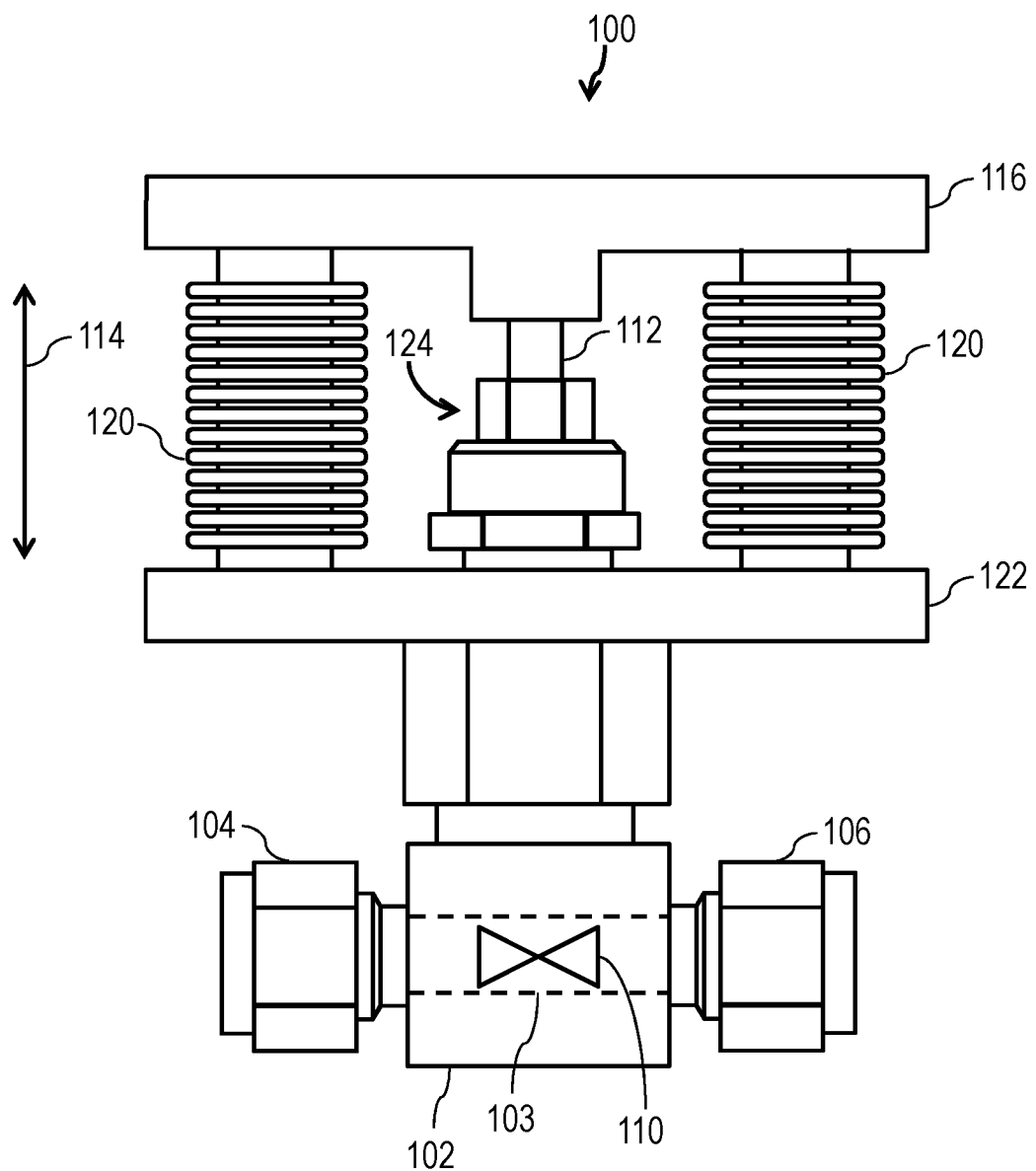
FIG. 1 illustrates an exemplary overpressure protective device in accordance with one embodiment.

With reference now to FIG. 1, there is illustrated an exemplary overpressure protective device 100 in accordance with one embodiment. As shown, overpressure protective device 100 includes a valve body 102, which may be formed of a metal or metal alloy such as, for example, brass, stainless steel, monel, or Iconel. Those skilled in the art will appreciate that in different embodiments different materials may be selected for valve body 102 and other components of overpressure protective device 100 depending on criteria such as rated operating temperature and pressure ranges, the presence of corrosive agents, etc. Valve body 102 an interior passage 103 through which a pressurized fluid (e.g., a gas or gas mixture) can pass between a first valve port 104, which may serve as a valve input, and a second valve port 106, which may serve as a valve output. In some embodiments, one or more of valve ports 104, 106 may have a coupling (e.g., a fluid-tight threaded fitting) suitable for connection to a pressure line. In other embodiments, valve ports 104, 106 may be configured for a welded connection, flanged connection, or other style of connection to a pressure line.

The flow of pressurized gas between valve ports 104, 106 through the interior passage 103 of valve body 102 is regulated by a valve 110 (schematically illustrated) housed within valve body 102. Valve 110, which may be, for example, a needle valve or a ball valve, is mechanically coupled to and operated by a valve stem 112. Valve stem 112 is movable linearly along line 114 (through a number of intermediate positions) between a default open position permitting pressure transfer between first valve port 104 and second valve port 106 and a closed position that prevents further transfer of increased pressure at first valve port 104 to second valve port 106. In one typical installation, first valve port 104 is left open to intake ambient pressure (e.g., within a pressure vessel), while second valve port 106 is coupled to a pressure line to which additional sensor(s) (e.g., a pressure sensor) or other equipment for which pressure protection is desired is/are connected.

Valve stem 112 is further mechanically coupled by a coupling member 116 (e.g., a metal rod) to the distal end of at least one, and in the illustrated embodiment, a pair of bellows 120. The proximal end of each of bellows 120 is mounted on a flange 122, which in the illustrated embodiment is fixed relative to valve body 102 and which, in some embodiments, has an aperture formed therein through which valve stem 112 freely passes. Each bellows 120 has a concertinaed exterior shell preferably formed of metal. The exterior shell provides a surface upon which the ambient pressure acts, causing the bellows 120 to expand under lower pressure and to contract under higher pressure. The exterior shell of each bellows 120 encloses a flexible hermetically sealed interior cavity. For the system to operate correctly, a pressure differential between the ambient pressure external to bellows 120 and the pressure within interior cavity of bellows 120 must be maintained across all operating temperatures. To maintain a consistent setpoint across a wide temperature range, the interior cavities of the bellows 120 are preferably vacuum-filled, resulting in an absolute pressure reference across all temperatures.

The pressure setpoint applied by overpressure protective device 100 is dependent on the effective surface area of bellows 120 as well as the spring rate of bellows 120, with both factors determining how much force and how much linear displacement bellows 120 will apply to valve stem 112 at a given ambient pressure. Changing either of these factors can serve as an effective coarse adjustment of the pressure setpoint. Finer adjustment of the pressure setpoint can be performed by mechanical adjustment of the initial distance between flange 122 and coupling member 116, enabling an overpressure protective device 100 to have more or less preload applied for a given application. In the illustrated embodiment, the initial distance between flange 122 and coupling member 116 and the linear displacement of valve stem 112 for a given increment in pressure differential applied to bellows 120 can be set by radially rotation of a friction collar 124 through which valve stem 112 passes.

In operation, as a bellows 120 expands or contracts due to changes in ambient pressure, the bellows 120 actuates coupling member 116, which controls the linear position of the valve stem 112 relative to valve body 102. For example, as ambient pressure increases, a large pressure differential forms between the interior cavity and exterior of the bellows 120. As a result, each bellows 120 contracts, linearly displacing valve stem 112 proximally toward valve body 102 and closing valve 110 to prevent increased pressure from being transferred from first valve port 104 to second valve port 106. If ambient pressure again drops below the pressure setpoint, the spring force of bellows 120 exceeds the force applied to the exterior surface of bellows 120 by the ambient pressure. As a result, the bellows 120 expands, linearly displacing valve stem 112 distally from valve body 102 and at least partially or fully re-opening valve 110.

Figure 2:
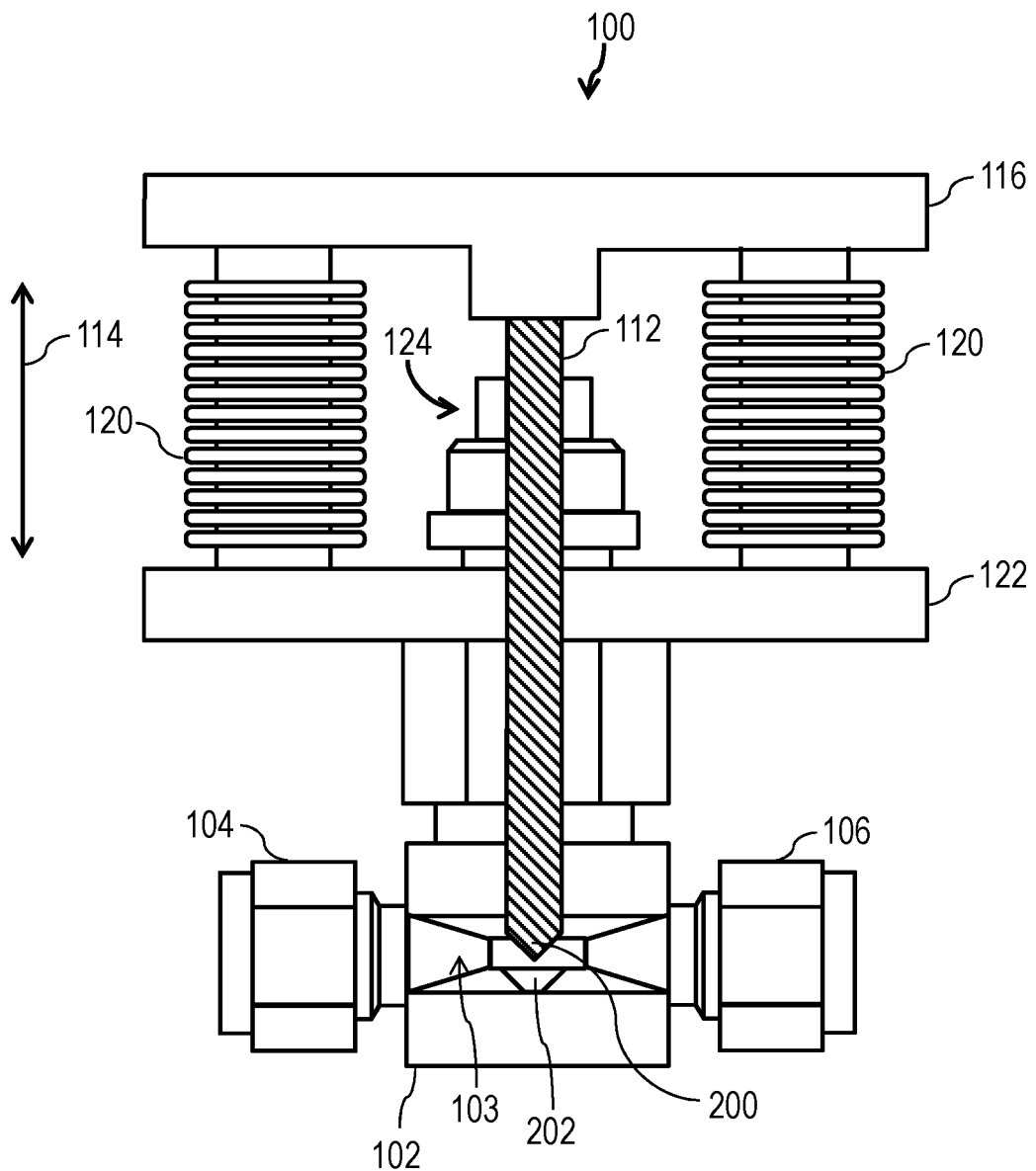
FIG. 2 depicts a partial section view of an exemplary overpressure protective device employing a needle valve in accordance with one embodiment.

With reference now to FIG. 2, there is depicted a partial section view of an exemplary overpressure protective device 100 employing a needle valve in accordance with one embodiment. In this example, the valve 110 within valve body 102 includes a needle 200 coupled to (including being formed integral with) the proximal end of valve stem 112 and a valve seat 202 disposed in interior passage 103 of valve body 102. Valve seat 202 has a recess formed therein configured to correspond to and to sealingly receive therein needle 200. Thus, as bellows 120 contract, needle 200 is linearly displaced proximally toward valve seat 202, eventually closing valve 110. Conversely, as bellows 120 expand, needle 200 is linearly displaced distally away from valve seat 202, eventually opening valve 110.

Figure 3A:
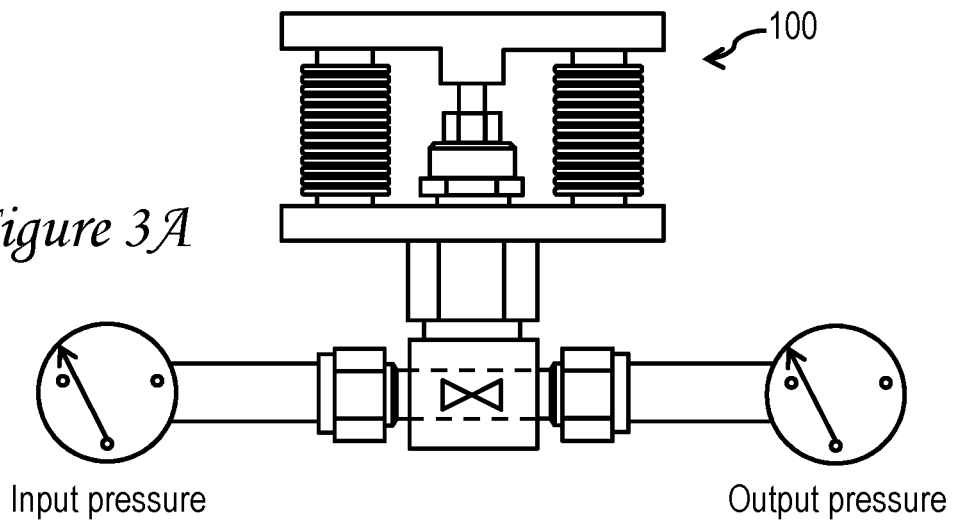
FIGS. 3A-3C are exemplary state diagrams illustrating operation of an overpressure protective device in accordance with one embodiment.
Figure 3B:
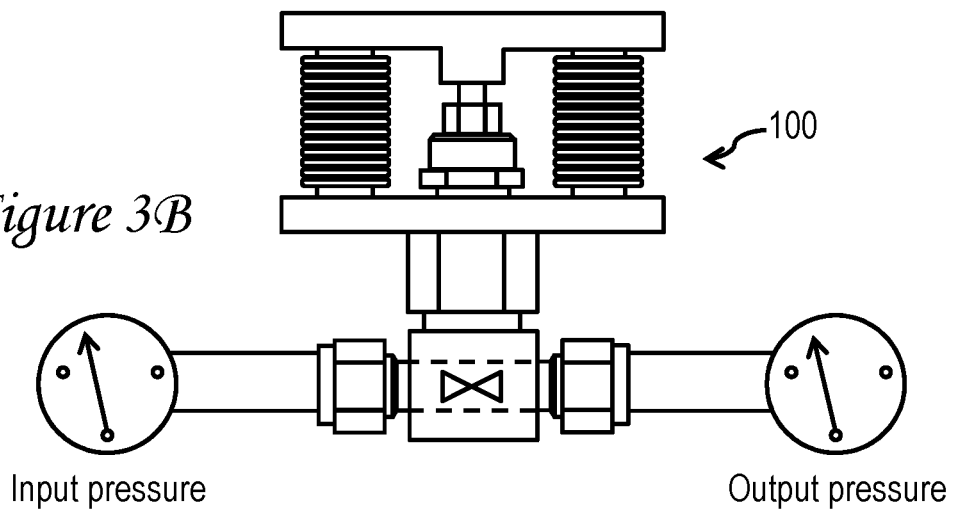
Figure 3C:
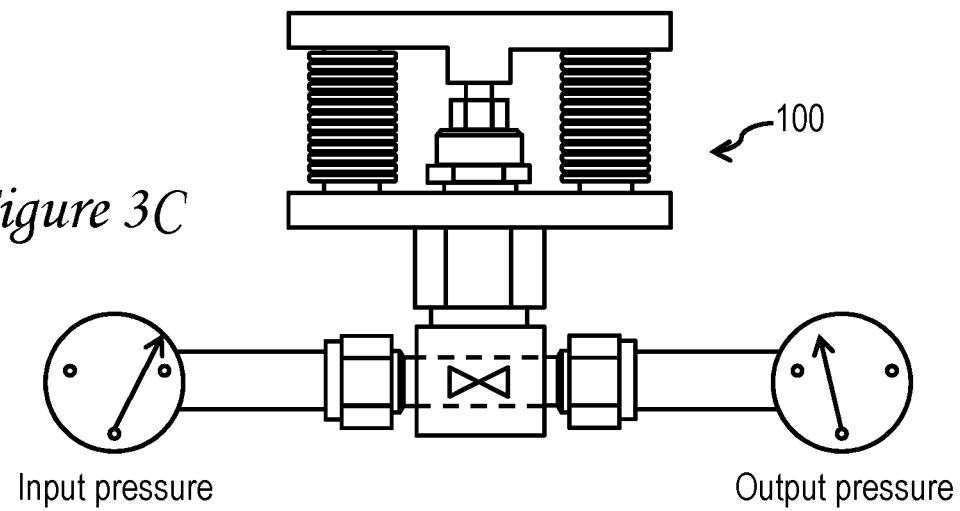

Referring now to FIGS. 3A-3C, there are depicted exemplary state diagrams illustrating operation of an overpressure protective device 100 in accordance with one embodiment. In this example, at time 1 shown in FIG. 3A, valve 110 of overpressure protective device 100 is in its normally open state, and both first valve port 104 and second valve port 106 have equal low pressures.

At a time 2 depicted in FIG. 3B, the ambient pressure at first valve port 104 has increased, but remains below the pressure setpoint. At time 2, the output pressure present at second valve port 106 can be less than or equal to the input pressure at first valve port 104.

Finally, at a time 3 illustrated in FIG. 3C, the input pressure present at first valve port 104 has exceeded the pressure setpoint, causing overpressure protective device 100 to close the valve 110 to prevent further pressure increases at first valve port 104 from being transferred to second valve port 106. Consequently, the pressure at second valve port 106 remains at or below the pressure setpoint despite further increases in pressure at first valve port 104.

Figure 4:
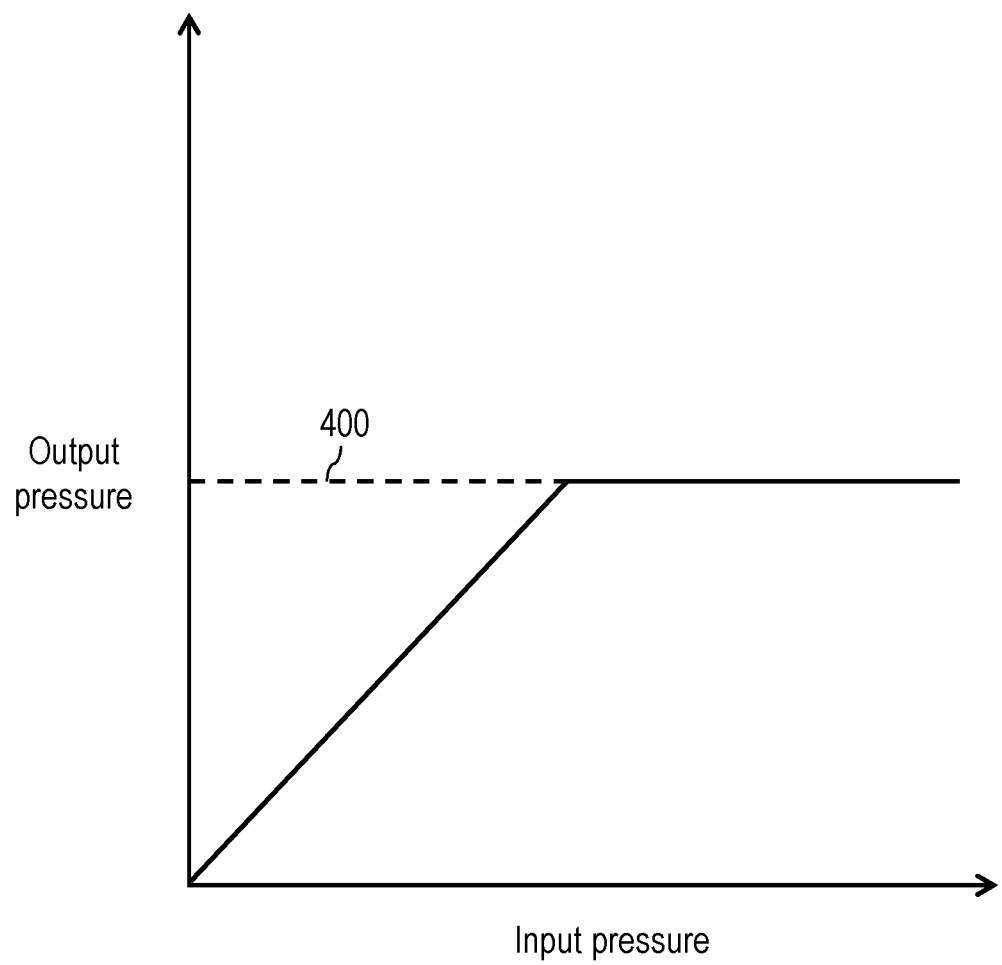
FIG. 4 is a graph illustrating input and output pressures for an overpressure protective device in accordance with one embodiment.

With reference now to FIG. 4, there is illustrated a graph of input and output pressures for an overpressure protective device 100 in accordance with one embodiment. In FIG. 4, the input pressure at first valve port 104 is plotted along the X (horizontal) axis, and output pressure at second valve port 106 is the plotted along the Y (vertical) axis. As shown, in this implementation, the input and output pressures remain the same between a pressure of 0 psi and a selected pressure setpoint 400. Once pressure setpoint 400 is reached, overpressure protective device 100 actuates valve stem 112 to close valve 110, blocking the communication of any additional pressure from first valve port 104 to second valve port 106. Above pressure setpoint 400, the output pressure remains constant despite any increase in input pressure. Consequently, instrumentation (or other pressure-sensitive components) connected to the second valve port 106 is protected from being subjected to potentially damaging pressure above pressure setpoint 400.

If the input pressure begins to decrease from a pressure above pressure setpoint 400, valve 110 remains closed, and the output pressure remains at a constant level until the input pressure drops below pressure setpoint 400. In response to the input pressure dropping below pressure setpoint 400, the spring force of bellows 120 linearly moves valve stem 112, again opening valve 110 and equalizing the input and output pressures.

As has been described, in at least one embodiment, an overpressure protective device for passively blocking flow of gas at a selected pressure setpoint includes a valve, a valve stem, and vacuum-filled bellows coupled to the valve stem. The vacuum-filled bellows are configured such that expansion and/or contraction of the bellows as a result of pressure changes present at the valve are harnessed to passively move the valve stem to operate the valve and block communication of pressures higher than a preconfigured pressure setpoint. If the process pressure drops below the pressure setpoint, the overpressure protective device operates the valve to again permit flow of pressurized gas through the valve.

The disclosed design for an overpressure protective device is suitable for use in high-temperature environments, for example, above 400 degrees, above 500 degrees, or above 600 degrees Fahrenheit. While normally open pressure relief valves are generally known in the art, existing designs typically employ temperature-sensitive materials such as polymers and/or organics and/or require precise fitment between a valve-actuating piston and a surrounding sleeve. As a result, conventional pressure relief valves are generally unsuitable for high-temperature applications. The passive design of the disclosed overpressure protective device is also advantageous in that it does not require use of supplemental cooling, regulated air, or electricity.

While various embodiments have been particularly shown and described, it will be understood by those skilled in the art that various changes in form and detail may be made therein without departing from the spirit and scope of the appended claims and these alternate implementations all fall within the scope of the appended claims.

What is claimed is:

1. A passive overpressure protective device, comprising:
a valve body having a first valve port, a second valve port, an interior passage communicating between the first and second valve ports, and a valve having an open condition in which pressure is communicated between the first and second valve ports and a closed condition in which pressure is not communicated between the first and second valve ports;
a valve stem mechanically coupled to the valve; and
a vacuum-filled bellows mechanically coupled to the valve stem, such that movement of the bellows responsive to an ambient pressure change passively moves the valve stem to change the valve between the open condition and the closed condition.

2. The passive overpressure protective device of claim 1, wherein:
the passive overpressure protective device includes a coupling member that mechanically couples the valve stem and the bellows; and
the valve stem is configured for linear translation proximal to and distal from the valve body.

3. The passive overpressure protective device of claim 2, further comprising a friction collar configured to set an initial linear position of the valve stem corresponding to a pressure setpoint at which the valve stem changes the valve to the closed condition.

4. The passive overpressure protective device of claim 1, wherein the valve comprises a needle valve.

5. The passive overpressure protective device of claim 1, wherein:
the bellows is a first bellows; and
the passive overpressure protective device includes a second bellows mechanically coupled to the valve stem.

6. The passive overpressure protective device of claim 1, wherein at least one of the first valve port and the second valve port includes a fluid-tight coupling.

7. A passive overpressure protective device, comprising:
a valve body having a first valve port, a second valve port, an interior passage communicating between the first and second valve ports, and a valve having an open condition that permits communication of pressure via the interior passage and a closed condition that blocks communication of pressure via the interior passage;
a valve stem that is mechanically coupled to the valve and that is configured for linear translation distal from and proximal to the valve body; and
a vacuum-filled bellows having a proximal end fixed with respect to the valve body and a distal end mechanically coupled to the valve stem, such that movement of the bellows responsive to an ambient pressure change passively linearly translates the valve stem to change the valve between the open condition and the closed condition.

8. The passive overpressure protective device of claim 7, further comprising a coupling member that mechanically couples the valve stem and the distal end of the bellows.

9. The passive overpressure protective device of claim 7, further comprising a friction collar configured to set an initial linear position of the valve stem corresponding to a pressure setpoint at which the valve stem changes the valve to the closed condition.

10. The passive overpressure protective device of claim 7, wherein the valve comprises a needle valve.

11. The passive overpressure protective device of claim 7, wherein:
the bellows is a first bellows; and
the passive overpressure protective device includes a second bellows having a proximal end fixed with respect to the valve body and a distal end mechanically coupled to the valve stem.

12. The passive overpressure protective device of claim 7, wherein at least one of the first valve port and the second valve port includes a fluid-tight coupling.

13. A method of providing passive overpressure protection, the method comprising:
coupling to a pressure line a passive overpressure protective device including:
a valve body having a first valve port, a second valve port, an interior passage communicating between the first and second valve ports, and a valve having an open condition in which pressure is communicated between the first and second valve ports and a closed condition in which pressure is not communicated between the first and second valve ports;
a valve stem mechanically coupled to the valve; and
a vacuum-filled bellows mechanically coupled to the valve stem, such that movement of the bellows responsive to an ambient pressure change passively moves the valve stem to change the valve from the open condition to the closed condition, wherein the coupling includes coupling the pressure line to the second valve port;
based on an ambient pressure change acting on the bellows, the bellows moving the valve stem to change the valve between the open condition and the closed condition.

14. The method of claim 13, wherein moving the valve stem includes moving the valve stem to change the valve from the open condition to the closed condition.

15. The method of claim 13, wherein moving the valve stem includes moving the valve stem to change the valve to from the closed condition to the open condition.

16. The method of claim 13, wherein moving the valve stem includes linearly translating the valve stem.

17. The method of claim 16, further comprising:
setting an initial linear position of the valve stem corresponding to a pressure setpoint at which the valve stem changes the valve to the closed condition.

18. The passive overpressure protective device of claim 1, wherein the valve comprises a ball valve.

19. The passive overpressure protective device of claim 7, wherein the valve comprises a ball valve.

20. A passive overpressure protective device, consisting essentially of:
a valve body having a first valve port, a second valve port, an interior passage communicating between the first and second valve ports, and a valve having an open condition in which pressure is communicated between the first and second valve ports and a closed condition in which pressure is not communicated between the first and second valve ports;
a valve stem mechanically coupled to the valve and configured for linear translation proximal to and distal from the valve body;
at least one vacuum-filled bellows mechanically coupled to the valve stem, such that movement of the bellows responsive to an ambient pressure change passively moves the valve stem to change the valve between the open condition and the closed condition;
a coupling member that mechanically couples the valve stem and the bellows; and
a friction collar configured to set an initial linear position of the valve stem corresponding to a pressure setpoint at which the valve stem changes the valve to the closed condition.

21. The passive overpressure protective device of claim 20, wherein the valve comprises a needle valve.

22. The passive overpressure protective device of claim 20, wherein the valve comprises a ball valve.

* * * * *